United States Patent Office 2,978,749
Patented Apr. 11, 1961

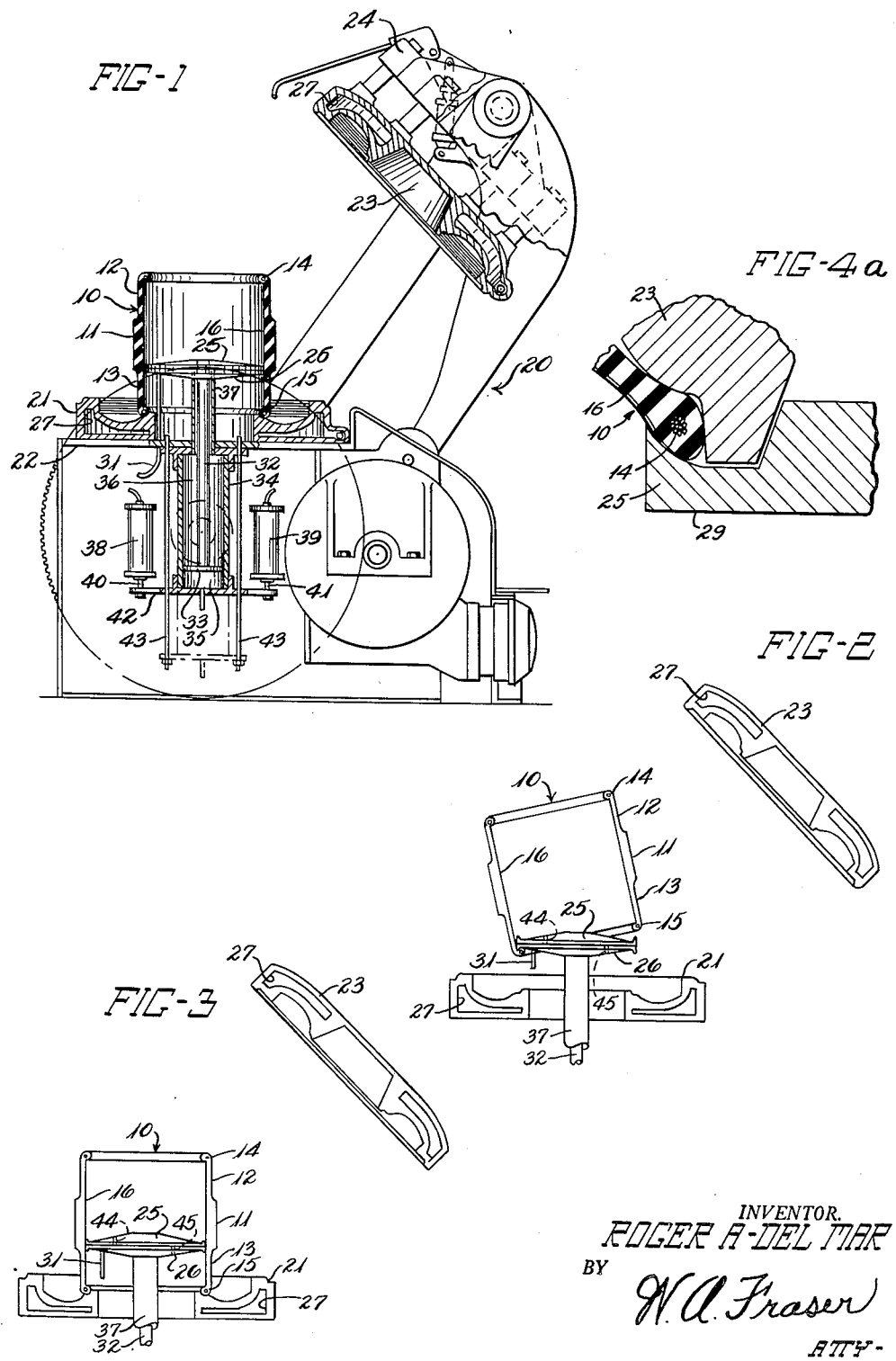

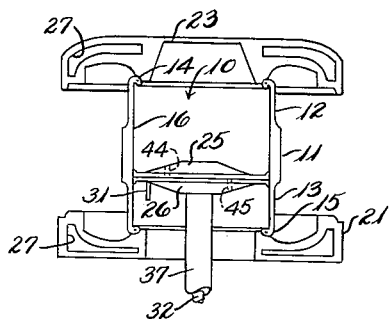
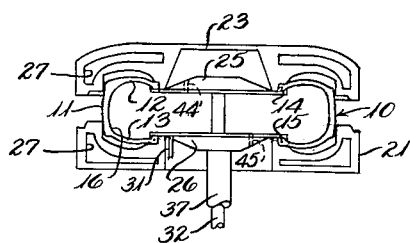
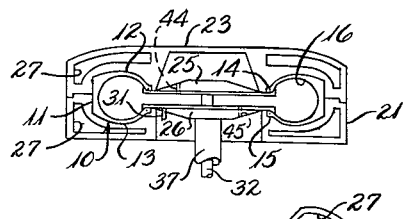
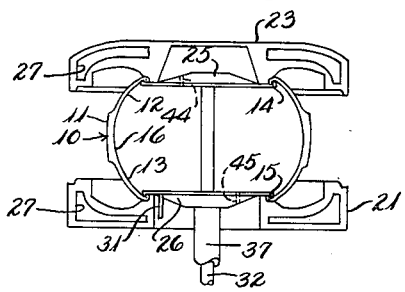
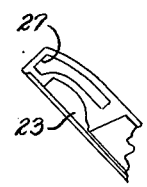
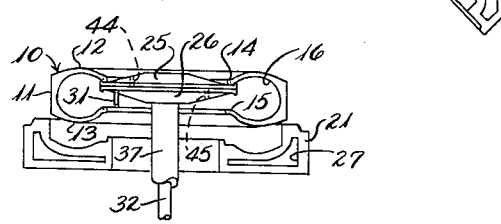
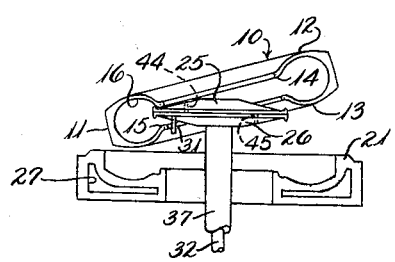
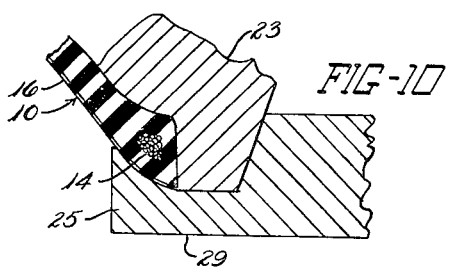

2,978,749

TIRE MANUFACTURE

Roger A. Del Mar, San Gabriel, Calif., assignor to The Firestone Tire & Rubber Company, Akron, Ohio, a corporation of Ohio Filed July 27, 1955, Ser. No. 524,717

13 Claims. (Cl. 18—17)

This invention relates to pneumatic tires and more particularly to an improved apparatus and method of shaping and curing tires by the use of internal fluid pressure.

Pneumatic tires are conventionally shaped and vulcanized by the use of an inflated bladder which expands the tread of the tire radially outwardly while the tire beads are mechanically forced together, the combined forces causing the tire to assume the necessary toroidal tire shape. The same bladder which shapes the tire is also used as a means to transmit internal heat and pressure for the finish molding and vulcanizing operation. Such bladders, which may take the form of a heavy walled tube similar to the inner tubes which are presently used with tires, or which may take the form of a cylindrical sleeve such as is commonly used in the automatic vulcanizing presses, are expensive to use. Their initial cost is high, their operating life is short and their use involves additional labor.

The present invention avoids the necessity of using such bladders by providing an apparatus and method for shaping and curing tires by applying fluids under pressure directly to the interior of a tire. In the apparatus the tire thus acts as a fluid container confining the internal fluid. The apparatus is simple and sure in its operation and an important savings in the cost of tires result.

Accordingly an object of the present invention is to provide an apparatus and means for applying internal fluid under pressure directly to the internal surface of a tire to shape and vulcanize the tire.

A more specific object is to provide means cooperating with the tire beads and with the tire mold whereby the tire comprises a closed container for confining fluids under pressure for the shaping, molding and vulcanizing of a tire.

Other objects are to provide means for controlling the position of the beads of a tire while the tire is being shaped by the use of internal pressure applied directly to the interior of the tire, and to provide positive means to mold the beads of a tire during such vulcanizing operation.

These and other objects and advantages will be more fully apparent from the following description of a preferred form of the invention, reference being had to the accompanying drawings in which:

Figure 1 is a side elevation partly in section of a tire molding press embodying the present invention, the tire being shown in position just at the start of the shaping and vulcanizing operation;

Figures 2–9 are somewhat diagrammatic views showing the various steps in the shaping and curing of a tire beginning with the positioning of a green tire in the mold in Figure 2 and ending with the removal of a finished tire in Figure 9.

Figure 10 is a fragmentary view on an enlarged scale showing the molding of a tire bead.

The invention is described in connection with the shaping and vulcanizing of a tubeless tire, generally indicated at 10, having the usual tread portion 11, sidewalls 12 and 13, and beads 14 and 15. The tire 10 also has a substantially air-impervious liner indicated at 16 of suitable composition such as butyl rubber, neoprene and the like.

In the present example the invention is shown embodied in a vulcanizing press similar to the one described in the U.S. patent to Soderquist, No. 2,495,664, issued January 24, 1950. Such a press which is indicated generally at 20 in Figure 1 utilizes a longitudinally split vulcanizing mold comprising a lower mold portion 21 which is fixed to the bed 22 of the press and a movable upper mold portion 23 which is carried by and moved into operative position by the ram portion 24 of the press. The mechanical construction of the press 20 is, in general, identical to that described in the Soderquist patent and need not be described in detail here. It is sufficient to note that in the wide open position of the press, Figure 1, the upper mold portion 23 is lifted upward and somewhat to the rear to permit an unvulcanized tire to be readily inserted in the press and to permit the vulcanized tire to be removed. As the press is closed, the upper mold 23 swings down and forwardly in an arcuate movement until the mold assumes the position shown in Figure 4, with the mold portions 21 and 23 parallel to and directly opposing each other. From this position the upper mold 21 moves directly downwardly toward the lower mold portion 23 until the press is completely closed. In closed position the mold portions 21 and 23 completely confine the tire.

Presses of this type heretofore have employed a closed bladder which is positioned within a tire and which is expanded by fluid under pressure so that it will, in turn, expand the tire into the desired toroidal shape. According to the present invention such bladders are dispensed with and the tires are shaped and vulcanized in the press by the direct application of the high-pressure fluids, such as air and steam, to the interior of the tire. In such an arrangement the tire itself acts as a closed container for the steam or other fluid. This is accomplished by means of a pair of bead holding plates 25 and 26 which force the beads 14 and 15, respectively, of the tire into sealing contact with the vulcanizing mold throughout the vulcanizing operation enabling the steam or other fluids to be retained within the tire and preventing such fluid from leaking around the beads and collecting in the mold between the molding surfaces and the tire. Such bead holding plates have the further functions of centering the tire within the mold and of applying mechanical pressure to mold the tire beads to shape.

The bead holding plates are moved in synchronism with the closing and opening movements of the press and in synchronism with the introduction and exhausting of fluids under pressure into and from the interior of the tire, but before discussing the construction and operation of the plates and the associated fluid system in detail, it is believed it will be helpful to describe the sequence of steps in the vulcanizing of a tire.

Initially, as shown in Figures 1 and 2, the press is in wide-open position with the mold portions 21 and 23 fully separated and with the bead plates 25 and 26 positioned together in a convenient position above the mold portion 21. An unvulcanized tire 10, just as it is removed from the tire building drum, is placed over the bead plates by canting the tire to a slight angle and forcing it over the plates, see Figure 2, until it takes the position shown in Figure 3 with the lower bead 15 of the tire resting on the mold portion 21.

As the press is closed, the upper mold portion 23 contacts bead 14 of the tire and in the next increment of motion the mold exerts pressure on the tire to create a seal between the tire beads and the mold, see Figure 4. As the press continues its closing movement, the force exerted by the upper mold portion 23 tends to collapse the tire and at the same time air under a pressure of about 15 to 20 pounds is introduced through a suitable conduit into the interior of the tire. The pressure of the air controls the manner in which the tire collapses by causing the tire to bulge progressively outwardly as the press urges the tire beads together, see Figure 5. By the time the mold is closed, the tire has assumed the toroidal shape shown in Figure 6.

During the first part of the shaping operation, i.e. from the position of Figure 4 to that of Figure 5, it is important that the tire beads 14 and 15 be free to rotate with respect to the mold as the tire is formed. Throughout this period the plates 25 and 26 are preferably maintained in neutral position out of contact with the beads, although they may be in contact so long as they do not exert such a pressure as to inhibit the rotation of the beads.

As soon as the press is completely closed the air is replaced by steam entered through the same conduit as the air, at a temperature of 375° and about 170 lbs. pressure. The molds are simultaneously heated by circulating saturated steam at 325° through the passages 27 in the mold sections.

It will be observed that the plates clamp the beads tightly against the mold before the introduction of the internal steam and throughout the vulcanizing period so that a tight seal is created between the tire beads and the mold eliminating the possibility of steam escaping and collecting between the tire and the mold.

Since the mold is heated to the proper temperatures, as the tire heats and becomes plastic the internal pressure will cause it to flow against the mold surfaces to assume its final form. Shortly after the introduction of steam to the interior of the tire and as soon as the rubber surrounding the tire beads has become plastic, the plates 21 and 23 are urged against the tire beads with increased force, to mold the beads into the shape which is desired in a finished tire, see Figure 6 and also Figure 10 where the relationship between the mold and a tire bead and a bead forming ring is shown on an enlarged scale. It should be noted from Figure 10 that the mold section 23 has a projection which abuts the portion 29 of plate 25 and positions the plate accurately so as to mold the bead 14 properly. The mold section 21 and plate 26 are similarly formed.

After the tire is fully cured the internal steam is relieved and the press is opened. In the initial phases of the opening stroke of the press the plates are maintained in light contact with the tire beads to hold them against the mold portions, stretching the tire to the position shown in Figure 7 causing the water which collects in the tire as the result of the condensation of steam during the curing operation to be spilled out of the tire through the bottom plate 25 and out of the press through suitable conduits, such as that indicated at 31. If desired, air under pressure can be introduced into the tire to blow the remaining portion of water, which fails to drain through conduit 31, out of the tire and onto the hot plates 25 and 26 where it will flash into steam.

After the water has been removed from the cured tire, the tire beads are released by returning the plates or rings 25 and 26 to the neutral position of Figure 2 and the opening movement of the press is continued. At this stage the tire rests on the upper bead plate 26 as shown in Figure 8. The tire is stripped from the bead plates by distorting the beads and tilting the tire in the manner shown in Figure 9 using a technique similar to that used in removing a tire from over the side flanges of a drop-center rim.

The bead plates or rings 25 and 26 are moved toward and away from the tire beads 14 and 15 by the mechanism shown in Figure 1. Thus the upper bead plate 25 is mounted on a piston rod 32 and moved by the piston 33 which is positioned within a cylinder 34 and which is moved within the cylinder by the introduction of fluid, preferably air, under pressure to the cylinder chambers 35 and 36 on either side of the piston. The lower bead ring 26 is secured by the sleeve 37 directly to the cylinder 34 and is moved with the cylinder by means of a pair of pneumatic cylinders 38 and 39 which are connected to the cylinder by the piston rods 40 and 41 and the yoke 42. The vertical movement of cylinder 34 is guided by the rods 43. By this arrangement the bead plates or rings 25 and 26 can be moved either independently of each other or moved together as a unit.

For example, the plates are positioned together as shown in Figure 2 when the tire is first placed in the press. As the tire collapses during the closing movement of the press, the plates are lowered slightly to provide room for the approach of the beads and this is done by lowering the cylinder 34 bodily, carrying the piston 32 along with the cylinder. Then, the plates or rings 25 and 26 are moved into position against the beads as shown in Figure 5 by lowering the cylinder 34 to bring the lower plate into position and by simultaneously raising piston 33 in the cylinder to bring the upper plate 25 against the bead. Still later when the vulcanizing is complete, the cylinder is held stationary and the upper plate 25 is raised by passing air into chamber 35 to elevate piston 33, see Figure 7. Finally the lower plate is raised to release bead 15. The various seals, conduits and valves to control the cylinder and piston movements are not shown for these details will be obvious to those skilled in the art, and per se form no part of the present invention.

The pressure of the plates 25 and 26 against the tire beads is regulated by the air pressures within the cylinders 34, 38 and 39. However, it is obvious that if plates 25 and 26 are imperforate, the pressures of the air and the steam within the tire will bear upon the plates and cause them to press against the tire beads with additional pressure. In order to obviate this difficulty, the plates 25 and 26 are preferably provided with perforations which enable the fluid pressures to be substantially balanced on each side of the plates. Such perforations are indicated at 44 and 45.

Various modifications and changes will occur to those skilled in the art without departing from the spirit and scope of the invention, the essential features of which are summarized in the claims below.

I claim:

1. A press for the shaping and curing of tires from bands in which the pressure shaping and curing medium is in direct contact with the interior of the tire, two relatively movable mold sections, means for moving the mold sections together with an uncured tire band between them, a pair of bead clamping rings located between the edges of the band, and means to separate the rings when the mold is closed to exert pressure against the inside surfaces of the bead portions of the band.

2. A press for the shaping and curing of tires from bands, two relatively movable mold sections having opposed bead seats, means for moving the sections toward each other with the edges of the uncured band located in the seats and for separating the mold sections after curing, a pair of bead clamping rings between the edges of the band, and means to spread the rings to exert pressure on the beads while the mold sections are in contact and to separate the rings to a greater extent on the opening of the press to spread the bead portions of the cured tire.

3. A press for the shaping and curing of tires from bands, two relatively movable mold sections having opposed bead seats, means for moving the sections toward each other with the edges of the uncured band located in the seats and for separating the mold sections after curing, a pair of bead clamping rings between the edges of the band, and means acting on the rings to force the edges of the bands on the bead seats when the mold is closed and to hold them in contact with the molds during the beginning of the opening movement.

4. A press for shaping and curing tires from bands, two relatively movable mold sections having bead seats, a pair of rings between the mold sections, and means acting on said rings during the commencement of the opening movement of the press to hold the beads of the tire against the bead seats and thereby spread the tire.

5. A press for shaping and curing tires, two relatively movable mold sections, a pair of rings between the mold sections, means acting on the rings during the commencement of the opening movement of the press to spread the beads of the tire, and a drain in communication with the interior of the tire to allow any liquid to drain from the tire.

6. Means for use in a press for shaping and curing tires from bands and having two relatively movable mold sections comprising, a pair of rings between the edges of the tire and between the mold sections, and means to manipulate said rings to spread them apart against the resistance of the mold sections while the press is closed, to further spread the rings apart during the commencement of the mold opening movement and to raise at least one ring during further opening of the press.

7. Means to exert pressure forcing the beads of the tire against the mold during the curing period comprising, two separable rings between the beads of the tire, said rings overlying the inner surfaces of the tire above the beads, and fluid operated means to force the rings apart while the mold is closed.

8. In a press for shaping and curing a tire with fluid pressure exerted directly on the inner surface of the tire, mold sections in the press, means for moving the mold sections together with a tire band between them, two rings located between the beads of the tire, said rings having a greater external diameter than the internal diameter of the tire beads, and overlying the inner surface of the tire above the beads, and means to spread the rings apart while the mold sections are closed to force the beads of the tire against the mold sections during the curing period.

9. In a press for shaping and curing tire bands while the pressure curing medium is in direct contact with the interior of the band, said press having a pair of opposed mold sections, each section having an angular circumferential bead seat and means to cause the mold sections to approach and recede, a pair of rings lying between the mold sections, the outer circumference of each ring being greater than the inner circumference of the adjacent bead seat and adapted to form with said seat an annular space for molding a tire bead, and means independent of the curing medium to separate the rings after the mold is closed to force the edges of the band into their respective beads seats, said last named means being operative to hold the rings against their respective mold sections during recession of the mold sections.

10. In a press for shaping and curing tire bands while the pressure curing medium is in direct contact with the interior of the band, said press having a pair of relatively movable upper and lower mold sections, each mold section having an angular circumferential bead seat, upper and lower rings located between the mold sections, the outer circumference of each ring exceeding the inner circumference of the adjacent bead seat and adapted to form with said seat an annular space to mold a tire bead, a first fluid pressure cylinder connected to the upper ring and a second fluid pressure cylinder connected to the lower ring, said cylinders being operative after the mold sections are in contact to separate the rings and force them against their adjacent mold section, said cylinders being operative during the first part of the mold opening movement to hold the rings in contact with their respective mold sections and thereby to spread the tire for drainage.

11. In a press for shaping and curing tire bands while the pressure curing medium is in direct contact with the interior of the band, said press having a pair of relatively movable upper and lower mold sections, each mold section having an angular circumferential bead seat, upper and lower rings located between the mold sections, the outer circumference of each ring exceeding the inner circumference of the adjacent bead seat and adapted to form with said seat an annular space to mold a tire bead, a first fluid pressure cylinder connected to the upper ring and a second fluid pressure cylinder connected to the lower ring, said cylinders being operative after the mold sections are in contact to separate the rings and force them against their adjacent mold section, said second cylinder being operative during the latter part of the mold opening movement to raise the first cylinder to elevate the cured tire above the lower mold section.

12. A press in accordance with claim 9 having means to drain residual fluid from the interior of the cured tire.

13. In a press for shaping and curing tires while a pressure curing medium is in direct contact with the interior of the tire, said press having a pair of relatively movable upper and lower mold sections, each mold section having a circumferential bead seat which is angular in cross section, upper and lower rings located between the mold sections, the outer circumference of each ring exceeding the inner circumference of the adjacent bead seat and adapted to form with said bead seat an annular space to mold a tire bead, a fluid operated cylinder connected to each ring and said cylinders being operative during the first part of the mold opening movement to hold the rings in contact with their respective mold sections, and a drain to provide escape for residual fluid from the cured tire.

References Cited in the file of this patent

UNITED STATES PATENTS

| | | |
|---|---|---|
| 2,715,245 | Soderquist | Aug. 16, 1955 |
| 2,741,799 | Heston | Apr. 17, 1956 |